(12) United States Patent
Chollet

(10) Patent No.: US 7,670,453 B1
(45) Date of Patent: Mar. 2, 2010

(54) DEVICE FOR TREATING A CONTAINER WITH MICROWAVE PLASMA

(75) Inventor: Patrick Chollet, Le Havre Cedex (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 10/501,718

(22) PCT Filed: Apr. 11, 2000

(86) PCT No.: PCT/FR00/00916
§ 371 (c)(1),
(2), (4) Date: Jan. 7, 2002

(87) PCT Pub. No.: WO00/66804
PCT Pub. Date: Nov. 9, 2000

(30) Foreign Application Priority Data
Apr. 29, 1999 (FR) .................................. 99 06178

(51) Int. Cl.
C23C 16/00 (2006.01)
H01L 21/306 (2006.01)

(52) U.S. Cl. .......................... 156/345.41; 118/723 MW

(58) Field of Classification Search ............ 156/345.36, 156/345.41, 345.42; 118/723 MW, 723 ME, 118/723 MA, 723 MR; 315/111.21
See application file for complete search history.

(56) References Cited

U.S. PATENT DOCUMENTS

| 4,831,963 A | * | 5/1989 | Saito et al. | ........... 118/723 MR |
|---|---|---|---|---|
| 4,893,584 A | * | 1/1990 | Doehler et al. | ...... 118/723 MW |
| 4,970,435 A | * | 11/1990 | Tanaka et al. | .......... 315/111.21 |
| 5,063,330 A | * | 11/1991 | Leprince et al. | ........ 315/111.21 |
| 5,074,245 A | * | 12/1991 | Ota et al. | ..................... 118/719 |
| 5,225,740 A | * | 7/1993 | Ohkawa | ................ 315/111.41 |
| 5,679,412 A | * | 10/1997 | Kuehnle et al. | ............. 427/534 |
| 5,849,366 A | * | 12/1998 | Plester | ....................... 427/491 |
| 5,961,776 A | * | 10/1999 | Sato et al. | ............. 156/345.41 |
| 6,158,383 A | * | 12/2000 | Watanabe et al. | ..... 118/723 AN |
| 6,390,018 B1 | * | 5/2002 | Ishii | ..................... 118/723 MR |
| 6,827,972 B2 | * | 12/2004 | Darras et al. | ................ 427/237 |

FOREIGN PATENT DOCUMENTS

| DE | 43 16 349 A1 | * | 11/1994 |
|---|---|---|---|
| DE | 4316349 | * | 11/1994 |
| EP | 0 346 168 | | 12/1989 |
| EP | 0 881 197 | | 12/1998 |
| WO | WO 99/17334 | | 4/1999 |
| WO | WO 99/49991 | * | 10/1999 |

\* cited by examiner

Primary Examiner—Luz L. Alejandro
(74) Attorney, Agent, or Firm—Sughrue Mion, PLLC

(57) ABSTRACT

A device for treating with microwave plasma a container. The container is placed in a chamber (12) made of a conductive material and is rotationally symmetrical, and the device includes a wave guide tunnel (15) substantially perpendicular to the axis (A1) of the chamber and which emerges therein in the form of a rectangular window whereof the smaller dimension corresponds to its dimension along the chamber axis. The internal diameter of the chamber (12) is such that the microwaves are propagated in the chamber mainly according to a mode whereby the electric field resulting from the propagation of the microwaves exhibit an axial rotational symmetry.

20 Claims, 1 Drawing Sheet

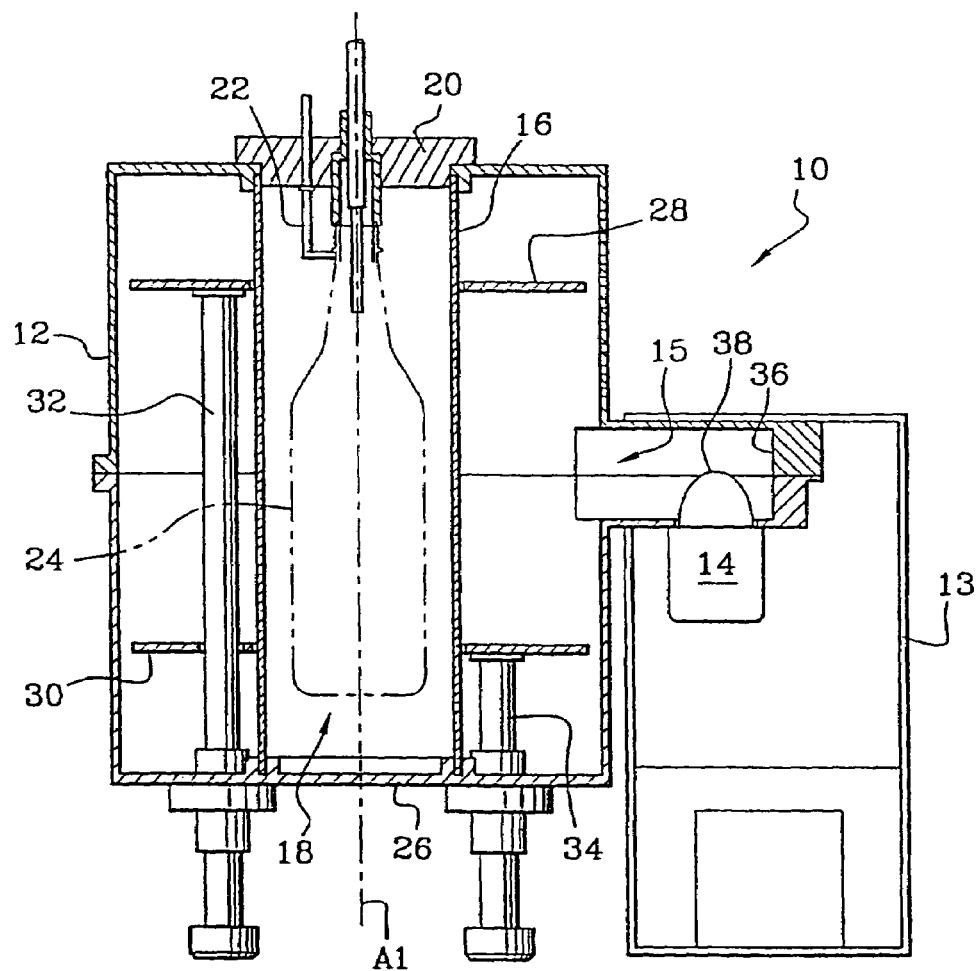
SOLE FIGURE

DEVICE FOR TREATING A CONTAINER WITH MICROWAVE PLASMA

BACKGROUND OF THE INVENTION

The invention concerns processes for processing the surfaces of a container, of thermoplastic material, for example.

By way of example, the invention will find application in the field of depositing thin barrier-effect layers on bottles or jars made of thermoplastic materials such as polyethylene terephtalate.

Indeed, there is currently a search to improve the barrier properties of these containers, particularly with a view to decreasing their permeability to gas or to increase their opacity to certain radiations, such as ultraviolet, in order to increase the preservation time of the products packaged in these containers.

To that end, various processes have been proposed that seek either to modify the material of the container directly, at least at its surface, or to coat the container with a layer of organic or inorganic material in order to improve the container's properties. One particularly favorable way to achieve this consists of low-pressure plasma processing. In such a process, a vacuum is created inside the enclosure at the same time as a reaction fluid is injected into it under an absolute pressure preferably of less than 1 mbar. The reaction fluid varies, depending on the nature of the material to be deposited. It includes a precursor of the material to be deposited, generally in the form of a gas or a gas mixture. It can also include a carrier gas.

This reaction fluid is subjected to microwave-type electromagnetic radiation suitable for exciting the precursor in order to form a plasma that creates active molecules. In the case of processing by deposit, these molecules can be deposited on the surface of the container with a particularly strong physical-chemical bond that guarantees the stability of the deposited material. Nevertheless, in some cases, the processing can consist of a simple modification of the surface of the material of which the container is made. There is then no deposit of a new layer of material, but rather a modification of the containers material by interaction with the molecules or active parts of the plasma.

In particular, the use of microwave type electromagnetic radiation makes it possible to obtain deposits having a special structure that is impossible to obtain with other types of radiation, such as widely used radio frequency radiation.

One of the difficulties encountered in implementing these processes is in obtaining a uniformity of the processing over the whole surface to be coated. In the case of processing by deposit, these problems of homogeneity can have repercussions in terms of thickness of the deposited layer and in terms of the composition of this layer. Obviously, this poor homogeneity of the deposited layer is not satisfactory.

To obtain a homogeneous treatment, then, the use of a plasma offers the greatest possible uniformity.

SUMMARY OF THE INVENTION

The purpose of the invention, therefore, is to propose a device that allows optimal propagation of the microwaves in order to ensure good homogeneity of the plasma. For deposit processes, this device should also make it possible to obtain this homogeneity while still using processing times that are compatible with industrial usage, i.e., with relatively fast deposit speeds.

To that end, the invention proposes a device for processing the surface of a container, of the type in which the process is accomplished by means of a plasma at low-pressure by excitation of a reaction fluid with microwave-type electromagnetic waves, and of the type in which the container is placed in an enclosure made of a conductive material inside of which enclosure, the microwaves are introduced by means of a coupling device, characterized in that the enclosure is a cylinder generated by rotation around a main axis of the container, in that the coupling device has a wave guide tunnel which extends in a direction appreciably perpendicular to the axis of the enclosure and which opens into one wall thereof in the shape of a window which, in projection on a plane tangent to the enclosure, is rectangular in shape, the smaller dimension of which rectangle corresponds to its dimension along the direction of the axis of the enclosure, and in that the inside diameter of the enclosure is such that the microwaves are propagated in the enclosure primarily according to a mode in which the electrical field resulting from the propagation of the microwaves has an axial symmetry generated by rotation.

According to other features of the invention:
when the microwaves are introduced into the enclosure in the absence of a container, the variation of intensity of the electrical field has two maximums on one radius of the enclosure;
the microwaves have a frequency of 2.45 GHz and the inside diameter of the enclosure is between 213 and 217 mm;
when the microwaves are introduced into the enclosure in the absence of a container, the variation of intensity of the electrical field has three maximums on one radius of the enclosure;
the microwaves have a frequency of 2.45 GHz and the inside diameter of the enclosure is between 334 and 340 mm;
when the microwaves are introduced into the enclosure in the absence of a container, the variation of intensity of the electrical field has four maximums on one radius of the enclosure;
the microwaves have a frequency of 2.45 GHz and the inside diameter of the enclosure is between 455 and 465 mm;
the wave guide tunnel has a rectangular cross section;
the microwaves have a frequency of 2.45 GHz, and the dimensions of the cross section of the wave guide tunnel are approximately 43 mm along the direction of the axis of the enclosure and approximately 86 mm along the perpendicular direction;
the reaction fluid is introduced into the container in such a way that the processing is applied to the inner face of the container;
the reaction fluid is introduced into the enclosure, outside the container, in such a way that the processing is applied to the outer face of the container;
inside the enclosure, a cavity is delimited by a wall made of a material that is appreciably transparent to the microwaves, and the container is received inside the cavity; and
the treatment includes a step in which a material is deposited by low-pressure plasma.

Other characteristics and advantages of the invention will appear from the detailed description that follows, as well as in the attached drawing in which the sole FIGURE illustrates diagrammatically, a device according to the invention.

BRIEF DESCRIPTION OF THE FIGURE

The device illustrated diagrammatically, in the sole FIGURE, is a processing station 10 according to the invention.

More particularly, it is intended to be used to implement a low-pressure plasma process for depositing a coating on the inner face of a container made of thermoplastic material.

DETAILED DESCRIPTION OF THE EXEMPLARY EMBODIMENTS

By way of example, the container can be a bottle made of polyethylene terephtalate (PET) and the coating to be formed can be composed of a carbon-based material. However, the invention can be advantageously implemented for other containers and for other types of coatings, for example for coatings with a silicon oxide or aluminum oxide base. All these coatings are particularly advantageous because they make it possible to greatly decrease the permeability of a PET bottle to such gases as oxygen and carbon dioxide.

The processing station 10 is designed to process one bottle at a time. However, this station will preferably be integrated into a rotary machine having a series of identical stations, in order to be able to process a large number of bottles in a given time.

The station 10, therefore, is comprised of an exterior enclosure 12 made of a conductive material, for example metal. The enclosure 12 is cylindrical with axis A1, and according to the invention, its dimensions are such as to favor a particular mode of coupling a microwave type electromagnetic field.

In fact, the station 10 is comprised of a generator 14 which is fitted to the outside of the enclosure 12 and which can deliver an electromagnetic field in the microwave range. The frequency of the microwave field delivered by the generator 14 is, for example, 2.45 GHz.

The generator 14 is mounted in a small box 13 outside the enclosure 12, and the electromagnetic radiation it delivers is led to the enclosure 12 by a tunnel-shaped wave guide 15 which extends along a radius of the cylindrical enclosure and which opens into the enclosure through a window, approximately at mid-height thereof.

As will be revealed in the details below, the shape and dimensions of the wave guide 15 are also suitable for allowing a favorable coupling of the microwave field in the enclosure 12.

Inside the enclosure 12 there is a tube 16, which is coaxial to the enclosure, which is essentially transparent to the microwaves, and which delimits, inside the enclosure 12, a cylindrical cavity 18 coaxial to the enclosure 12. The tube 16 is, for example, made of quartz. The cavity 18 is closed at one of its axial ends, in this instance at the lower end, by a lower transverse wall 26 of the enclosure 12. The upper end of the cavity 18, however, is open to allow a bottle to be inserted inside the cavity in which it will undergo processing. The bottle is placed essentially coaxial to the enclosure 12 and to the cavity 18.

A cover 20 is intended to close and seal the upper end of the cavity 18 in such a way that a vacuum can be applied thereto. In order to allow the container 24 to be inserted in the cavity 18, the cover 20 is axially movable.

Means 22 are provided on the cover 20 to hold the container 24 by the neck, as well as means to create different levels of vacuum in the cavity 18. Thus, in order to process the inner surface of the container, a vacuum corresponding to an absolute pressure of approximately 0.1 mbar is created in the container 24, and on the outside of the bottle, a vacuum is created corresponding to an absolute pressure of approximately 50 mbar. The vacuum created around the container 24 prevents it from being subjected to an excessive pressure differential that could cause the deformation of the container. However, this vacuum is not strong enough to allow the formation of a plasma, so that the energy provided by the microwaves is not dispersed to the outside of the bottle where a deposit is not desired. Another mode of operation is to create, around the container 24, a sufficiently low vacuum, for example below 0.01 mbar, so that there is no plasma excitation there. This mode of operation is technically less advantageous because it requires more time to achieve this low level of pressure.

Of course, the cover 20 also comprises means to inject into the enclosure, in this instance inside the container 24, a reaction fluid that contains at least one precursor for the material that is to be deposited on the inner wall of the container. It will be noted that the treatment of the container 24 can also include the implementation of processes in addition to the depositing process. Thus, for example, a first process of preparing the surface of the container could be carried out prior to making the deposit, or a process subsequent to the deposit could be carried out.

The device also comprises ring-shaped plates 28, 30 with axis A1 that are arranged in the enclosure 12, around the quartz tube 16. The two plates 28, 30 are axially offset with respect to each other, so that they are axially arranged on either side of the window, through which the wave guide 15 opens into the enclosure 12. However, their respective axial positions can vary, depending on the shape of the container 24 to be processed. In effect, the plates 28, 30, which are made of electrically conductive material, are intended to form short circuits for the electromagnetic field introduced into the enclosure 12, so as to axially confine the field in order to have a maximum intensity at the level of the effective treatment area. The plates 28, 30 are therefore borne by axially sliding rods 32, 34, thus allowing fast and easy adjustment of the axial position of the plates.

According to the invention, the proposed device should make it possible to obtain, inside the enclosure, a plasma having the highest possible homogeneity. To do this, the intensity of the electromagnetic field must be distributed as uniformly as possible, and in particular, the intensity of the field at one point of the enclosure should be essentially independent of the axial position of the point in question, but also essentially independent of the angular position of this point around the axis A1.

To that end, it has been determined that the best results have been obtained with the processing station as defined below.

The wave guide 15, which, as was seen, extends along a radius with respect to the axis A1, is radially delimited toward the exterior by a back wall 36 placed approximately 185 mm from the axis A1. The wave guide 15 has a constant rectangular cross section, the height of which, along the direction of the axis A1, is approximately 43 mm and the width approximately 86 mm.

The generator 14 is arranged in such a way that its antenna 38, which penetrates into the wave guide 15 through an opening made in a lower wall of the wave guide, is situated radially with respect to the back wall 36 at the predetermined distance recommended by the manufacturer of the generator.

However, to obtain an optimum distribution of the intensity of the electromagnetic field, it was found that the determining factor is the inside diameter of the enclosure 12.

Indeed, with the use of a 2.45 GHz microwave generator, particularly convincing results were obtained in the following three cases:

the inside diameter of the enclosure is between 213 and 217 mm, in which case, in the absence of a container and vacuum in the cavity, the variation of intensity of the electrical field has two maximums on one radius of the enclosure;

the inside diameter of the enclosure is between 334 and 340 mm, in which case, in the absence of a container and vacuum in the cavity, the variation of intensity of the electrical field has three maximums on one radius of the enclosure;

the inside diameter of the enclosure is between 455 and 465 mm, in which case, in the absence of a container and vacuum in the cavity, the variation of intensity of the electrical field has four maximums on one radius of the enclosure.

These results can be demonstrated by placing sheets of thermo-sensitive paper inside the enclosure in various orientations (radial, circumferential and transversal) in order to obtain an image of the electromagnetic field predominating in the enclosure. In all three cases, it will be noted that the electromagnetic field has an axial symmetry generated in rotation around the axis A1.

In the case of an enclosure with an inside diameter of about 215 mm, a quartz tube 10 could be used, for example, that has an inside diameter of about 85 mm. With such a device, tests have made it possible to deposit, on the interior face of a bottle made of PET and a volume of 500 ml, a homogenous coating of a carbon base material with average deposition speeds of 300 to 400 angstroms per second. Thus, the processing time for obtaining an effective barrier layer is on the order of 1 to 3 seconds, which allows this device to be used on an industrial scale.

In this way, the invention makes it possible to produce an industrial device for applying on the internal wall of the container, a deposit having all the required qualities, particularly in terms of barrier properties, in a very short time. In addition, this device is sufficiently simple and compact to be able to be installed in a revolving machine capable of processing a large number of containers per hour.

Moreover, such a device can be used to perform processes other than deposits of coatings, for example processes using a gas or gas mixture such as oxygen, nitrogen or argon which does not cause a deposit of material, but which, when brought to a plasma state, modify the surface structure of the material of which the container is made. It can also be used to process the external surface of the container. In this case, of course, the reaction fluid is injected in the cavity, but around the exterior of the container.

The invention claimed is:

1. A device for processing the surface of a container, in which the processing is accomplished by a low-pressure plasma, by excitation of a reaction fluid with microwave electromagnetic waves, the device for processing comprising:

an enclosure in which the container is placed, the container having an elongated neck portion, the enclosure being made of a conductive material, inside of the enclosure, microwaves are introduced by a coupling device;

a tube which surrounds the container to delimit an internal cavity of the enclosure, such that an open space is provided between the enclosure and the tube;

a device extending into the enclosure to hold the neck of the container;

wherein the enclosure is a cylinder and its central axis is a main axis of the container, such that the coupling device has a wave guide tunnel which is disposed outside of the tube and which extends towards the main axis of the enclosure and which is provided within a window of a wall of the enclosure, said wave guide tunnel projected on a plane tangent to the enclosure and is rectangular in shape, the smaller dimension of the rectangle corresponds to its dimension along the direction of the axis of the enclosure, and wherein the inside diameter of the enclosure is such that the microwaves are propagated into the open space between the enclosure and the tube, before reaching the tube, primarily according to a mode in which an electrical field, resulting from the propagation of the microwaves, has an axial symmetry with respect to the central axis of the enclosure, the device for processing further comprising a first ring-shaped plate and a second ring-shaped plate provided entirely inside the enclosure and formed so as to surround the tube, wherein the first ring-shaped plate is axially offset from the second ring-shaped plate so that the first ring-shaped plate is provided above the window of the wall of the enclosure and the second ring-shaped plate is provided below the window of the wall of the enclosure.

2. The device according to claim 1, wherein the enclosure is a predetermined size such that if microwaves are introduced into the enclosure in the absence of a container, the variation of intensity of the electrical field has two maximums on one radius of the enclosure.

3. The device according to claim 2, wherein the microwaves have a frequency of 2.45 GHz, and the inside diameter of the enclosure is between 213 and 217 mm.

4. The device according to claim 1, wherein the enclosure is a predetermined size such that if microwaves are introduced into the enclosure in the absence of a container, the variation of intensity of the electrical field has three maximums on one radius of the enclosure.

5. The device according to claim 4, wherein the microwaves have a frequency of 2.45 GHz and the inside diameter of the enclosure is between 334 and 340 mm.

6. The device according to claim 1, wherein the enclosure is a predetermined size such that if microwaves are introduced into the enclosure in the absence of a container, the variation of intensity of the electrical field has four maximums on one radius of the enclosure.

7. The device according to claim 6, wherein the microwaves have a frequency of 2.45 GHz and the inside diameter of the enclosure is between 455 and 465 mm.

8. The device according to claim 1, wherein the wave guide tunnel has a rectangular cross section.

9. The device according to claim 8, wherein the microwaves have a frequency of 2.45 GHz, and the dimensions of the cross section of the wave guide tunnel are 43 mm along the direction of the main axis of the enclosure and 86 mm along a direction perpendicular to the main axis.

10. The device according to claim 1, wherein the container comprises a processed inner face.

11. The device according to claim 1, wherein the container comprises a processed outer face.

12. The device according to claim 1, wherein the tube comprises a wall made of a material that is appreciably transparent to the microwaves, and the container is received inside the cavity.

13. The device according to claim 1, wherein the container comprises a material deposited by the low-pressure plasma.

14. The device according to claim 1, wherein the tube is made of quartz.

15. A device according to claim 1, wherein the wave guide protrudes past a wall of the enclosure towards the container.

16. The device according to claim 1, wherein the container is disposed so that its bottom is spaced apart from the enclosure.

17. The device according to claim 1, wherein the wave guide is in the form of a rectangle having a uniform rectangular cross section extending to a back wall of the wave guide.

18. The device according to claim 1, further comprising a generator which produces the microwave electromagnetic waves, and the generator is disposed to protrude into the wave guide tunnel.

19. The device according to claim 1, wherein the tube is coaxially disposed with respect to the enclosure.

20. The device according to claim 1, wherein the first ring-shaped plate and the second ring-shaped plate are each respectively supported on an axially slidable rod.

* * * * *